(12) United States Patent
Darby et al.

(10) Patent No.: US 10,969,950 B2
(45) Date of Patent: Apr. 6, 2021

(54) DYNAMIC RESIZABLE MEDIA ITEM PLAYER

(71) Applicant: Google Inc., Mountain View, CA (US)

(72) Inventors: Matthew Thomas Darby, San Francisco, CA (US); Clifford Curry, San Francisco, CA (US); Bryce Gibson Reid, San Francisco, CA (US); Andrey Doronichev, San Francisco, CA (US); Andrew Janich, Mountain View, CA (US); Alan Joyce, Mountain View, CA (US); Taeho Ko, San Francisco, CA (US); Justin Lewis, Marina Del Rey, CA (US); Kevin Greene, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 382 days.

(21) Appl. No.: 14/716,315

(22) Filed: May 19, 2015

(65) Prior Publication Data
US 2016/0147424 A1     May 26, 2016

Related U.S. Application Data

(63) Continuation of application No. 14/457,005, filed on Aug. 11, 2014.
(Continued)

(51) Int. Cl.
*G06F 3/0484*     (2013.01)
*G06Q 30/02*     (2012.01)
(Continued)

(52) U.S. Cl.
CPC ........ *G06F 3/04847* (2013.01); *G06F 3/0482* (2013.01); *G06F 3/04842* (2013.01);
(Continued)

(58) Field of Classification Search
USPC ....... 715/719, 716, 779, 201, 702, 723, 727, 715/765, 769, 781, 788, 790, 810, 835,
(Continued)

(56) References Cited

U.S. PATENT DOCUMENTS

| 8,429,516 B1 | 4/2013 | Riggs et al. |
| 8,429,530 B2 * | 4/2013 | Neuman ............. G06F 3/04817 715/716 |

(Continued)

FOREIGN PATENT DOCUMENTS

| CN | 101681194 A | 3/2010 |
| CN | 102693071 A | 9/2012 |
| CN | 102804179 A | 11/2012 |

OTHER PUBLICATIONS

Extended European Search Report for Application No. 14836061.3 dated Jan. 5, 2017, 8 pages.
(Continued)

*Primary Examiner* — Shourjo Dasgupta
(74) *Attorney, Agent, or Firm* — Lowenstein Sandler LLP

(57) ABSTRACT

Described herein is a method for managing media item playback. A method includes presenting a media player in a first portion of a user interface (UI) on a mobile device, the media player to provide playback of a first media item. The method also includes receiving a user selection of a second media item via a second portion of the UI. The user selection indicates a user request to move the second media item from the second portion of the UI to the first portion of the UI. The method further includes upon receiving the user selection, causing the media player to provide playback of the second media item when playback of the first media item is complete. The method includes receiving, via a second portion of the UI, a user request to perform an activity that is independent of the viewing of the first media item or the second media item. The method further includes presenting (Continued)

content associated with the requested activity while continuing to provide playback of either the first media item or the second media item in the media player of the first portion of the UI.

17 Claims, 11 Drawing Sheets

Related U.S. Application Data

(60) Provisional application No. 61/865,086, filed on Aug. 12, 2013.

(51) Int. Cl.
 *G06F 3/0482* (2013.01)
 *H04L 29/06* (2006.01)

(52) U.S. Cl.
 CPC ..... *G06F 3/04845* (2013.01); *G06Q 30/0277* (2013.01); *H04L 65/60* (2013.01)

(58) Field of Classification Search
 USPC ............ 715/838; 707/E17.009; 725/100, 40; 345/530; 348/E5.006
 See application file for complete search history.

(56) References Cited

U.S. PATENT DOCUMENTS

| | | |
|---|---|---|
| 2005/0016136 A1 | 7/2005 | Capps |
| 2005/0166136 A1* | 7/2005 | Capps .................. H04N 21/40 715/202 |
| 2005/0188406 A1 | 8/2005 | Gielow et al. |
| 2005/0289475 A1* | 12/2005 | Martin .................. G06F 16/954 715/765 |
| 2006/0123353 A1 | 6/2006 | Matthews et al. |
| 2006/0242602 A1 | 10/2006 | Schechter et al. |
| 2007/0003224 A1* | 1/2007 | Krikorian ............. G06F 3/0481 386/220 |
| 2007/0239546 A1 | 10/2007 | Blum et al. |
| 2008/0071875 A1 | 3/2008 | Koff et al. |
| 2008/0072152 A1 | 3/2008 | Crow et al. |
| 2008/0084400 A1 | 4/2008 | Rosenberg |
| 2008/0111822 A1 | 5/2008 | Horowitz et al. |
| 2008/0147214 A1 | 6/2008 | Lee et al. |
| 2008/0163082 A1 | 7/2008 | Rytivaara |
| 2008/0209066 A1* | 8/2008 | Spio ........................ H04L 65/80 709/231 |
| 2008/0222687 A1 | 9/2008 | Edry |
| 2008/0235588 A1* | 9/2008 | Gonze .................. G11B 27/034 715/719 |
| 2008/0319856 A1* | 12/2008 | Zito .................. G06F 17/30873 705/14.73 |
| 2009/0024923 A1* | 1/2009 | Hartwig ............ G06F 17/30781 715/716 |
| 2009/0049385 A1 | 2/2009 | Blinnikka et al. |
| 2009/0193138 A1 | 7/2009 | Capps |
| 2009/0248702 A1 | 10/2009 | Schwartz |
| 2009/0249222 A1 | 10/2009 | Schmidt et al. |
| 2009/0319925 A1* | 12/2009 | Katinsky .................. H04L 67/02 715/763 |
| 2010/0293190 A1* | 11/2010 | Kaiser ..................... G06F 3/048 707/769 |
| 2010/0325549 A1* | 12/2010 | Gibson ................. G06F 9/4443 715/733 |
| 2011/0113354 A1* | 5/2011 | Thiyagarajan ........... G09G 5/14 715/760 |
| 2011/0131518 A1 | 6/2011 | Ohashi |
| 2011/0138354 A1 | 6/2011 | Hertenstein et al. |
| 2011/0161818 A1* | 6/2011 | Viljamaa ................ G11B 27/28 715/720 |
| 2011/0202842 A1* | 8/2011 | Weatherly ................. G06F 8/38 715/716 |
| 2012/0040720 A1 | 2/2012 | Zhang |
| 2012/0054616 A1 | 3/2012 | Mittal |
| 2012/0102437 A1 | 4/2012 | Worley et al. |
| 2012/0144416 A1 | 6/2012 | Wetzer et al. |
| 2012/0144424 A1 | 6/2012 | Ganesan et al. |
| 2012/0185798 A1 | 7/2012 | Louch et al. |
| 2012/0210205 A1 | 8/2012 | Sherwood et al. |
| 2012/0210226 A1 | 8/2012 | McCoy et al. |
| 2012/0240037 A1 | 9/2012 | Migos et al. |
| 2012/0254931 A1 | 10/2012 | Oztaskent et al. |
| 2012/0272148 A1 | 10/2012 | Strober |
| 2012/0278725 A1* | 11/2012 | Gordon ............. H04N 21/2665 715/738 |
| 2012/0282914 A1 | 11/2012 | Alexander |
| 2012/0311074 A1 | 12/2012 | Arini et al. |
| 2013/0018960 A1 | 1/2013 | Knysz et al. |
| 2013/0091299 A1 | 4/2013 | Wei et al. |
| 2013/0132984 A1 | 5/2013 | Walter et al. |
| 2013/0151351 A1* | 6/2013 | Tsai ....................... G06F 3/0481 705/14.71 |
| 2013/0167058 A1 | 6/2013 | LeVee et al. |
| 2013/0318429 A1* | 11/2013 | Dantas .................... G06F 3/048 715/234 |
| 2014/0006979 A1 | 1/2014 | Venkatesh et al. |
| 2014/0032635 A1 | 1/2014 | Pimmel et al. |
| 2014/0136314 A1 | 5/2014 | Kiet et al. |
| 2014/0207911 A1 | 7/2014 | Kosmach et al. |
| 2014/0258441 A1 | 9/2014 | LHeureux et al. |

OTHER PUBLICATIONS

International Searching Authority, "Notification of Transmittal of the International Search Report and the Written Opinion of the International Search Authority, or the Declaration," for International Application No. PCT/US2014/50772, dated Nov. 28, 2014, 9 pages.
Office Action for Chinese Patent Application No. 201480056136.2, dated Jun. 1, 2018, 43 pages.

\* cited by examiner

DYNAMIC RESIZABLE MEDIA ITEM PLAYER

RELATED APPLICATION

This application is a continuation of U.S. patent application Ser. No. 14/457,005, filed Aug. 11, 2014, which claims the benefit of U.S. Provisional Application No. 61/865,086, filed Aug. 12, 2013, the entire contents of which are incorporated herein by reference.

TECHNICAL FIELD

Implementations of the present disclosure relate to a media item playback system, and more specifically, to a dynamic resizable media item player on a mobile device.

BACKGROUND

Online content sharing platforms typically allow users to upload, view, and share digital content such as media items. Media items may include audio clips, movie clips, TV clips, music videos, images, or other multimedia content. Users may use computing devices (such as smart phones, cellular phones, laptop computers, desktop computers, netbooks, tablet computers, televisions, set top boxes) to use, play, and/or otherwise consume media items (e.g., watch digital videos, and/or listen to digital music).

SUMMARY

The below summary is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

In one implementation, a method includes presenting a media player in a first portion of a user interface (UI) of a content sharing platform on a mobile device, the media player to provide playback of a media item. The method further includes receiving, via a second portion of the UI, a user request to perform an activity that is independent of the viewing of the media item. The method further includes presenting content associated with the requested activity while continuing to provide playback of the media item in the media player of the first portion of the UI.

In some implementations, the method can include receiving, via the second portion, a request for video playback of a second media item associated with the activity. The method can further include presenting video playback of the second media item in the first portion of the UI. The media player can be presented as part of an application. The activity can be associated with the application. The content can be provided by the media platform. The activity can be a search for a second media item. The content can be provided by a search engine platform. The activity can be social networking. The content presented in the second portion can be provided by a social network application. The activity can be messaging. The content can include a plurality of messages from at least two different users of a message service. The activity can include an interaction with an electronic advertisement. The first portion of the UI can be presented semi-transparently. The second portion of the UI can be associated with a social network application.

In additional implementations, computing devices for performing the operations of the above described implementations are also disclosed. Additionally, in implementations of the disclosure, a computer readable storage media stores methods for performing the operations of the above described implementations. Further, in implementations of the disclosure, means for performing the operations of the above described implementations are also disclosed.

BRIEF DESCRIPTION OF THE DRAWINGS

The present disclosure will be understood more fully from the detailed description given below and from the accompanying drawings of various embodiments of the present disclosure, which, however, should not be taken to limit the present disclosure to the specific embodiments, but are for explanation and understanding only.

DETAILED DESCRIPTION

Conventionally, media applications on mobile devices typically have two mutually exclusive modes of operation-discovery or playback. Because of this, a user may not be able to simultaneously watch a media item and do other online activities (e.g., searches for other media items). For example, users may have to stop video playback to search for another video to watch. This is particularly problematic with short-form video (e.g., short video clips), when a larger number of video discovery decisions may be made in a relatively short amount of time as compared to long-form video (e.g., movies). This may inhibit users from exploring and searching for more content and may lead to less video consumption. Further, conventional media applications on mobile devices may not permit a user to perform other operations outside of the media application (e.g., browsing content, surfing the web, social networking, checking email) while consuming a media item at the same time. Under these conventional systems, video playback is typically stopped when a user starts doing any other type of activity.

Implementations of the present disclosure address these and other shortcomings by providing playback of a media item while allowing a user to perform other online or offline activities within the interface. For example, a graphical user interface (GUI) may be presented with a dynamic media player that can play a video and be persistently visible when a user browses the web at the same time. The dynamic media player provides a "watch-while" experience. The "watch-while" experience allows a user of a content sharing platform or service to minimize the dynamic media player into a smaller sub-viewer in a GUI. The GUI may be provided, for example, by a mobile application (e.g., an "app" provided by a content sharing service) running on a user mobile device, by an operating system of the user mobile device or by a web browser running on the user mobile device (e.g., when the user accesses the website of the content sharing service). With the video player minimized in a first portion of the GUI, the user can then engage in other activities, such as browse or search for media items to decide what to watch next in a second portion of the GUI without interrupting video playback by the video player in the first portion of the GUI.

Although the description herein refers to video as an example type of media item, implementations of the disclosure may apply to other types of media items such as images, audio, and other multi-media.

Figure 1:
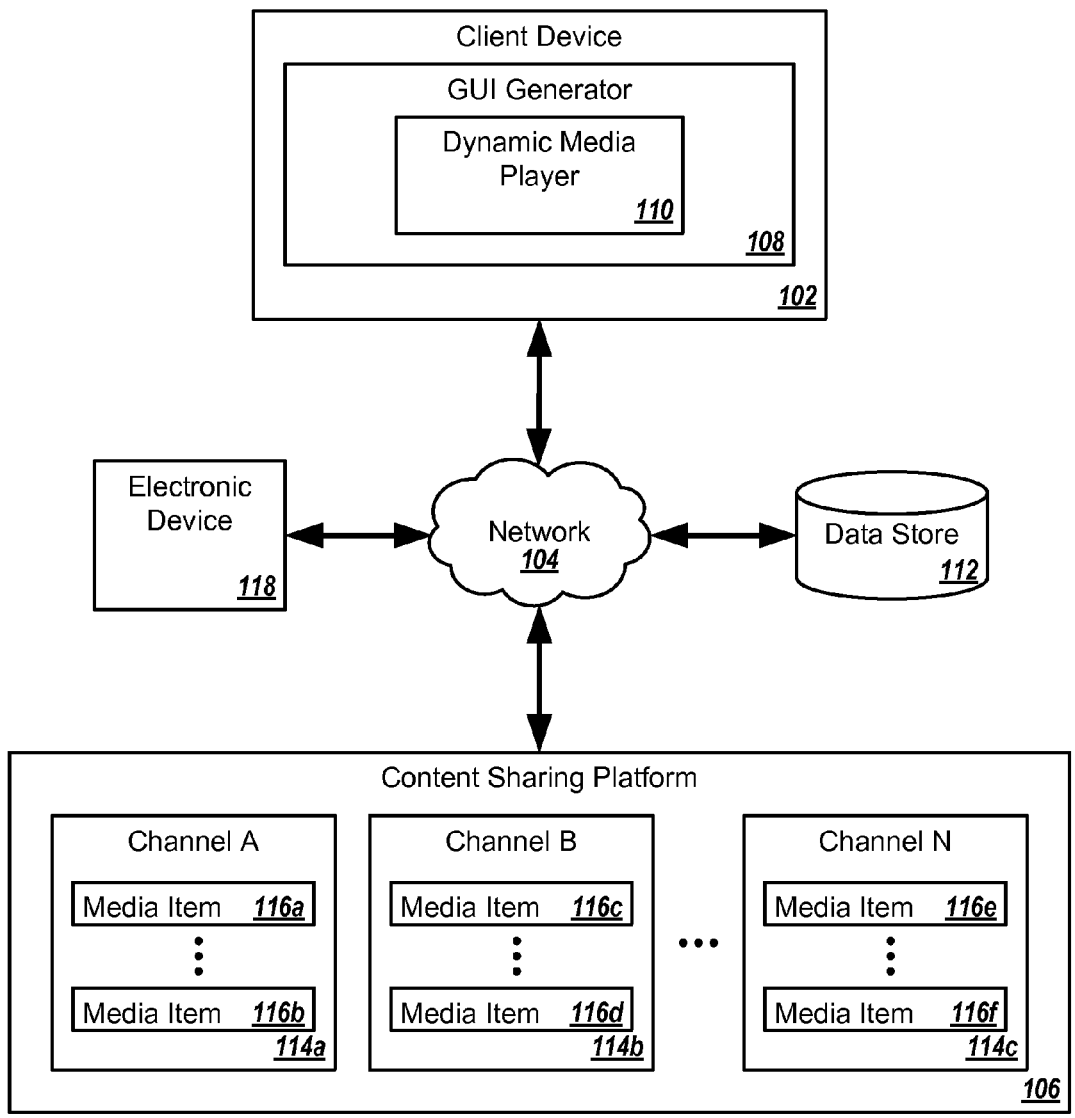
FIG. 1 illustrates an example system architecture in which embodiments of the present disclosure can be implemented.

FIG. 1 illustrates an example system architecture 100 for providing a dynamic media player 110 in accordance with implementations. The system architecture 100 includes one or more client devices 102, a network 104, a data store 112, and a content sharing platform 106. In one implementation, the network 104 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof. In one implementation, the data store 112 may be a memory (e.g., random access memory), a cache, a drive (e.g., a hard drive), a flash drive, a database system, or another type of component or device capable of storing data. The data store 112 may also include multiple storage components (e.g., multiple drives or multiple databases) that may also span multiple computing devices (e.g., multiple server computers).

The client device 102 may include computing devices such as personal computers (PCs), laptops, mobile phones, smart phones, tablet computers, netbook computers etc. In some implementations, the client device 102 may also be referred to as "user device" or "user mobile device." Each client device 102 includes a dynamic media player 110, as described herein.

In one implementation, the content sharing platform 106 may be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to provide a user with access to media items and/or provide the media items to the user. For example, the content sharing platform 106 may allow a user to consume, upload, search for, approve of ("like"), dislike, and/or comment on media items. The content sharing platform 106 may also include a website (e.g., a webpage) that may be used to provide a user with access to the media items.

A media item may be consumed via the Internet, the content sharing platform 106 and/or via a mobile device application. In one implementation, the content sharing platform 106 may store the media items using the data store. The content sharing platform 106 may also store "playlists" of media items. A playlist may be a list of media items that can be played (e.g., streamed) in a sequential or shuffled order. For example, when the playback of one media item from the playlist is finished, the playback of the next media item in the playlist can automatically begin.

The content sharing platform 106 may include multiple channels 114a-c (e.g., channels A through N). A channel 114 can be data content available from a common source or data content having a common topic or theme. The data content can be digital content chosen by a user, digital content made available by a user, digital content uploaded by a user, digital content chosen by a content provider, digital content chosen by a broadcaster, etc. For example, a channel X can include videos Y and Z. A channel 114 can be associated with an owner, who is a user that can perform actions on the channel. Different activities can be associated with the channel 114 based on the owner's actions, such as the owner making digital content available on the channel, the owner selecting (e.g., liking) digital content associated with another channel, the owner commenting on digital content associated with another channel, etc. The activities associated with the channel 114 can be collected into an activity feed for the channel. Users, other than the owner of the channel, can subscribe to one or more channels in which they are interested. Once a user subscribes to a channel 114, the user can be presented with information from the channel's activity feed. If a user subscribes to multiple channels, the activity feed for each channel to which the user is subscribed can be combined into a syndicated activity feed. Information from the syndicated activity feed can be presented to the user.

Each channel 114 may include one or more media items 116. Examples of a media item can include, and are not limited to, digital video, digital movies, digital photos, digital music, website content, social media updates, electronic books (ebooks), electronic magazines, digital newspapers, digital audio books, electronic journals, web blogs, real simple syndication (RSS) feeds, electronic comic books, software applications, etc. As used herein, "media," "media item," "online media item," "digital media," "digital media item," "content," and "content item" can include an electronic file that can be executed or loaded using software, firmware or hardware configured to present the digital media item to an entity.

Each client device 102 includes a GUI generator 108 that may present a GUI including a dynamic media player 110 to provide playback of a media item. The GUI generator 108 may be, for example, part of a web browser, a mobile app (e.g., a standalone application that allows users to view digital media items 114 such as digital videos, digital images, electronic books, etc.), or an operating system that can manage the dynamic media player 110 and may send media items to the dynamic media player 110 for playback. Some example GUIs provided by the GUI generator 108 include control elements in the form of a button (e.g., a button for subscribing to a channel, playing a media item, minimizing a media player, etc.). Alternatively or in addition, various other control elements can be used for selection by a user such as a check box, a link, etc. Example GUIs may include a search tool (e.g., to search for a channel or media item of interest), an upload tool (e.g., to upload a new media item to an internet-based content platform), a menu (e.g., to navigate to different GUIs of the internet-based content platform), a user identifier, a settings tool (e.g., to configure settings of GUIs of the internet-based content platform), a mini-player tool (e.g., to minimize a dynamic media player that presents media items while other content is being displayed on a screen of the client device), a navigation tool for navigating to other platforms (e.g., an email platform, a social platform, a storage platform, an image platform, a calendar platform, among others), etc.

The dynamic media player 110 included in the GUI may render, display, and/or present the content (e.g., a web page, media items) to a user. The dynamic media player 110 may be provided to the client device 102 by a server and/or content sharing platform 106. For example, the dynamic media player 110 may be an embedded media player that is embedded in web pages provided by the content sharing platform 106.

The GUI may include a first portion to present the dynamic media player 110 providing media item playback and a second portion to present other content provided by the same application (e.g., a web browser or an application of the content sharing platform 106) or a different application (e.g., a media discovery application, an email application, a social network application, a calendar application, etc.). The media player providing media item playback can be visible to a user while the user engages in other activities via the second portion of the GUI. In implementations, the dynamic media player 110 can appear to "float" on top of other content provided by the same or different applications. For example, the dynamic media player 110 can appear to float on top content of a media discovery application, a content hosting application, a media item consumption platform, a social networking application, a browser, or the like.

A user can minimize or summon the dynamic media player 110 by using gestures on a graphical user interface (GUI). For example, a user can touch a static media player (not shown) and, while in contact with a touch screen, can drag it to another position in the GUI, causing the dynamic media player 110 to appear in that other position in the GUI. The dynamic media player 110 can be smaller than a static media player, thus allowing other content to be displayed within the same GUI. As discussed above, the dynamic media player 110 can be managed by an application (e.g., a mobile app or a web browser), and while a media item provided by the application (e.g., a media item requested from the content sharing platform 106) is being played by the dynamic media player 110 managed by the application, the user can browse content or perform other activities within the same application. In another example, the dynamic media player 110 can be managed by an operating system of the client device 102, and while a media item provided by one application is being played by the dynamic media player 110 managed by the operating system, the user can switch to another application and browse content or perform other activities within the other application. In either example, the dynamic media player 110 can be used to permit simultaneous media consumption along with other activities enabled by the same or different applications.

In implementations, the dynamic media player 110 is enabled by default and can change position based on a user's touch input (e.g., gestures) to enable a "watch-while" experience. The dynamic media player can be minimized, summoned, resized and dismissed using gestures (e.g., pinch to expand or contract, swipe up to expand, swipe down to collapse). The dynamic media player 110 may be implemented in any of a variety of sizes and is not limited to a specific position within the GUI of the content sharing platform application. In some embodiments, the dynamic media player 110 may be referred to as a "mini player." The dynamic media player may also be moved (e.g., dragged) within the GUI to suit the user's preferences.

For example, the dynamic media player 110 can be minimized or maximized by swiping vertically, and can be dismissed by swiping horizontally. The dynamic media player 110 can also be dismissed via a click target (e.g., an "x" button). In other implementations, when the user starts to drag the dynamic media player 110, a drag target (e.g., a trash can) appears on the right hand side of the screen. The user can drag the dynamic media player 110 on top of the drag target to dismiss it. In another example, tapping on the dynamic media player 110 expands the dynamic media player 110. The dynamic media player 110 can have "magnetic-like" attachment to a specific region of a GUI presented on the client device. When using a gesture to move the dynamic media player 110, it can snap into place and become docked. Such attachment to a specific region of the screen can persist regardless of other content within the GUI. For example, the docking positions remain even when a user is checking email in a different application.

In some implementations, the dynamic media player 110 may be introduced as a smaller format player and persist in this size throughout the user's viewing experience. In further implementations, a transparency level of the dynamic media player 110 can be variable and can be based on user gestures. For example, a user may prefer to see both a video playing in the dynamic media player as well as text behind the dynamic media player. To accomplish this, the dynamic media player 110 is semi-transparent. In implementations, the dynamic media player transparency can be adjustable by gestures. The user's interaction with the GUI may be passed through to the content below the semi-transparent player, and the user could browse while watching a media item in the dynamic media player 110. In some implementations, the dynamic media player 110 may remain in its original location, while the "browsing" content is presented on top of the dynamic media player 110 (in some cases, the dynamic media player 110 may be partially obscured).

In some implementations, the dynamic media player 110 may maintain the same quality of the presented content item (e.g., video) while the dynamic media player 110 is minimized. As a result, after the user "unminimizes" the dynamic media player 110, the quality remains as it was before the dynamic media player 110 was minimized. In contrast, conventional solutions typically downgrade the quality of a video when the video is presented in a smaller format because the video is originally downloaded with a higher resolution and then transcoded to a lower quality to suit the size of the player. As such, with conventional solutions, when the player is returned to a larger size, it continues to show a low quality until a next high-quality video chunk can be downloaded.

In some embodiments, the dynamic media player 110 may be part of video-chat (video messaging) component of a social network. For example, a user may view a video of a person that they are video-chatting with in a minimized view while simultaneously browsing the social network application. The user could then make the video-chatting window/player full-sized again at will.

The GUI generator 108 may also present a video that is being recorded by a camera of the client device 102 while the user browses other features in the content sharing platform application, for example, while sharing previously recorded videos, or changing video-recording settings on the fly.

In some implementations, a mapping application may show a live navigation map in a minimizable view of a content item player, so that a user can change navigation settings and still see what is coming up in their navigation route. In other implementations, the mapping application may show a "street view" of a location (e.g., current location, selected location) of a mobile device while the rest of the screen shows a map or navigation information.

In some implementations, metadata can be presented via the interface that describes characteristics or information of a media item being presented in the dynamic media player 110. The metadata can be displayed over the top of the dynamic media player or can be displayed adjacent to the dynamic media player 110. In implementations, when a new media item is played in the dynamic media player 110, metadata of the new media item can be presented via the interface. Examples of the media item metadata can include a title, a length, an artist, an uploading entity, among others.

In implementations, transport controls can be presented in the GUI for the dynamic media player 110. The transport controls can include next, previous, pause, play, stop, scrub, and the like. The transport controls can be displayed over the dynamic media player 110 or adjacent to the dynamic media player 110. The transport controls can be toggled between a hidden and a displayed state. For example, the transport controls can be hidden and when a user taps the screen of the client device 102, the transport controls can be displayed in response.

The system 100 may also include an electronic device 118, which may include any type of computing devices such as personal computers (PCs), laptops, mobile phones, smart phones, tablet computers, netbook computers, televisions, set top boxes etc. As described in greater detail below, a user may select a media item 116 via a GUI presented on the client device 102, and the media item 116 may be played on the electronic device 118 in response to the user selection.

In general, functions described in one implementation as being performed by the content sharing platform can also be performed on the client device in other implementations if appropriate. In addition, the functionality attributed to a particular component can be performed by different or multiple components operating together. The content sharing platform can also be accessed as a service provided to other systems or devices through appropriate application programming interfaces, and thus is not limited to use in websites.

FIGS. 2A-5B illustrate example graphical user interfaces (GUI) 200 in accordance with some embodiments. The example GUIs 200 may be presented by and/or displayed within a web browser (e.g., when a user accesses a content sharing platform via a web browser), or within an application (e.g., an app, an application, a program, a software module/component, etc., that may be used to subscribe to channels and view, play, and/or consume media items of the channels). Some example GUIs include control elements in the form of a button (e.g., a button for subscribing to a channel). However, it should be noted that various other control elements can be used for selection by a user such as a check box, a link, or any other user interface elements.

Figure 2A:
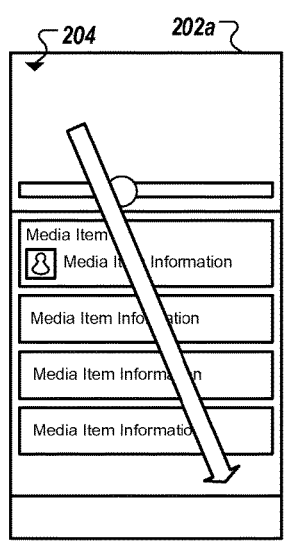
FIG. 2A illustrates an example graphical user interface (GUI) that includes a dynamic media player, in accordance with embodiments.
Figure 2B:
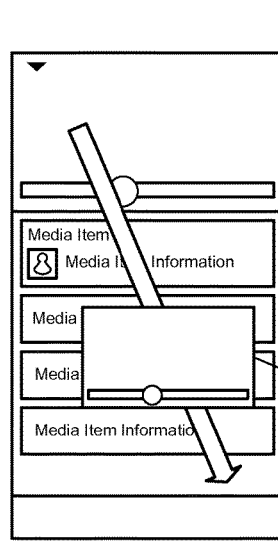
FIG. 2B illustrates an example GUI that includes an alternate view of a dynamic media player, in accordance with embodiments.
Figure 2C:
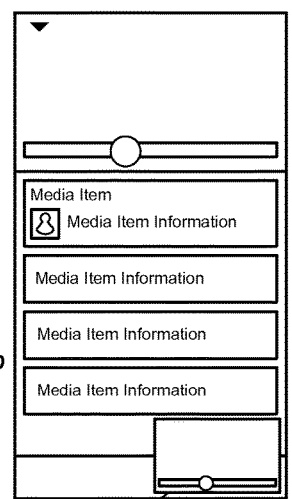
FIG. 2C illustrates an example GUI that includes an alternate view of a dynamic media player, in accordance with embodiments.

FIG. 2A illustrates an example GUI 200a for minimizing a dynamic media player 202a in accordance with aspects of the present disclosure. The example GUI 200a includes an indicator 204 that the dynamic media player 202a may be minimized. The indicator 204 may be any type of button, selectable icon, etc. In an example, the indicator 204, when activated, can present the dynamic media player seemingly on top of the other elements of the GUI, as illustrated in FIG. 2B. Selecting (e.g., clicking or tapping) on the indicator 204 (e.g., the small triangle in the upper-left corner of the dynamic media player) may cause the dynamic media player 202a to transition to a minimized state 202b (FIG. 2B). In some embodiments, the indicator 204 is a drag animation that visually appears in the GUI 200 once a user attempts to minimize the dynamic media player 202a. In one implementation, the user can also make a selection anywhere in the dynamic media player 202a and drag downwards and the minimized dynamic media player 202b appears in the GUI, as in GUI 200b of FIG. 2B. In another implementation, a user can use gestures to minimize or summon the minimized dynamic media player 202b. An example user gesture is illustrated by the downward arrow. In this example, the user touches a screen of a client device over the dynamic media player 202a, and while maintaining contact with the screen of the client device, the user drags the dynamic media player 202a to another location on the GUI 200. FIG. 2B illustrates an example in which the dynamic media player 202b is "in transit" (while the user is still manipulating the position of the dynamic media player 202b using gestures). FIG. 2C illustrates a docked position of the dynamic media player 202c. When minimized, the dynamic media player 202c may be presented in the lower right corner of the GUI 200c. In other implementations, the dynamic media player may reside in other portions of the GUI while "minimized." While minimized, the dynamic media player 202c may continue to play a media item while the user performs other actions within the GUI 200.

Figure 3:
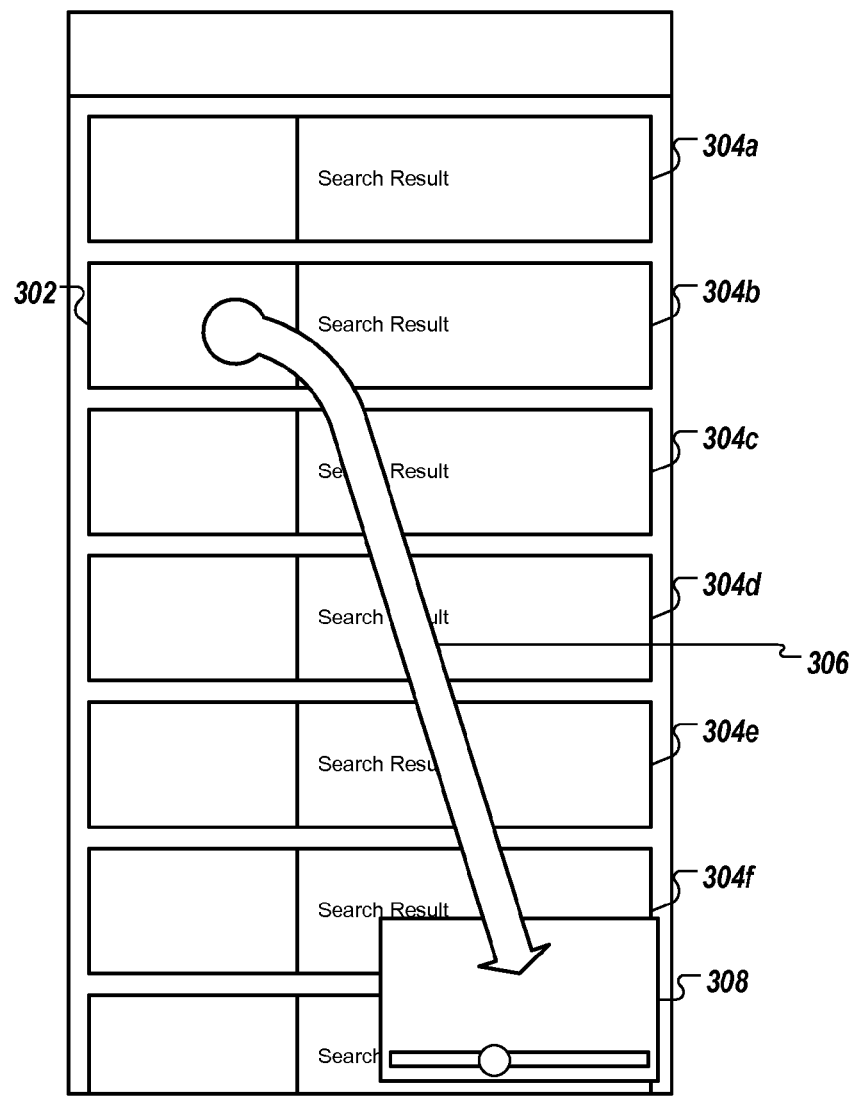
FIG. 3 illustrates an example GUI that includes a dynamic media player, in accordance with another embodiment.

FIG. 3 illustrates an example GUI 300 for adding a media item 302 to a queue, such as a playlist, from a search result 304 in accordance with aspects of the present disclosure. In an example, the user gestures are illustrated by the arrow 306. At the upper portion of the arrow 306, a circle illustrates the user's initial touch on a screen of a client device. While maintaining contact with the screen, the user can drag the search result into the dynamic media player 308. The dynamic media player 308 can begin playing the media item 302 represented in the search result 304b. In other implementations, when a media item 302 is drag-and-dropped onto the dynamic media player 308, the media item 302 can be added to a playlist.

Figures 4A, 4B, 4C:
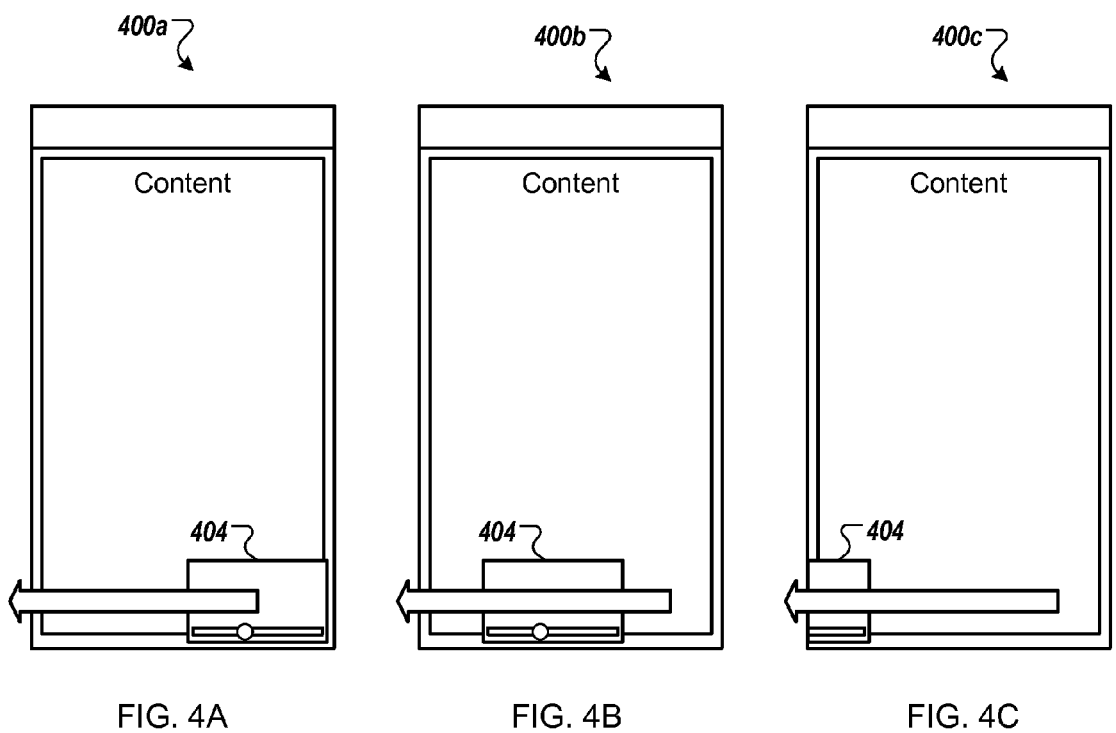
FIG. 4A illustrates an example GUI that includes a dynamic media player, in accordance with another embodiment.
FIG. 4B illustrates an example GUI that includes an alternate view of a dynamic media player, in accordance with another embodiment.
FIG. 4C illustrates an example GUI that includes an alternate view of a dynamic media player, in accordance with another embodiment.

FIGS. 4A-C illustrates example GUIs 400a-c for dismissing the dynamic media player 404 in accordance with aspects of the present disclosure. The dynamic media player 404 can be dismissed using gestures, such as when a user clicks or touches a "close" button or uses gestures. As illustrated in FIG. 4A, a user touches the dynamic media player 404 on a screen of a client device and, while maintaining contact with the screen, the user slides the dynamic media player 404 off of the screen, as illustrated by FIG. 4B. The dynamic media player 404 is dismissed when the user moves (e.g., swipes) the dynamic media player 404 off of the screen. In implementations, when a predetermined portion of the dynamic media player 404 (e.g., fifty percent, sixty percent, etc.) is no longer visible on the GUI 400, the dynamic media player 404 will continue to dismiss even if the user loses contact with the screen. For example, at FIG. 4C approximately sixty percent of the dynamic media player 404 is not visible on the GUI 400c. Should the user lose contact with the screen, the dynamic media player 404 may still dismiss from the visible area of the GUI.

In other implementations, while the dynamic media player 404 is being moved toward a dismissal point (e.g., edge of a screen), a media item being played by the dynamic media player 404 can change state, such as become more transparent. The closer the dynamic media player 404 is to the dismissal point, the closer dynamic media player 404 is to being transparent. The transparency level of the dynamic media player 404 can change depending on its proximity to the dismissal point. In further implementations, when a media item (e.g., video) is being played while the dynamic media player 404 is being dismissed, sound associated with the video can be attenuated. For example, as the dynamic media player 404 approaches the dismissal point, an audio portion of the video can decrease in volume. In other implementations, the dynamic media player 404 can undergo a combination of the transparency alteration and sound attenuation while it is being dismissed. Should a user decide to not dismiss the dynamic media player 404 after starting to move the dynamic media player 404 toward the dismissal point, the user can swipe in the opposite direction and any transparency alteration or sound attenuation can be reversed.

Figure 5A:
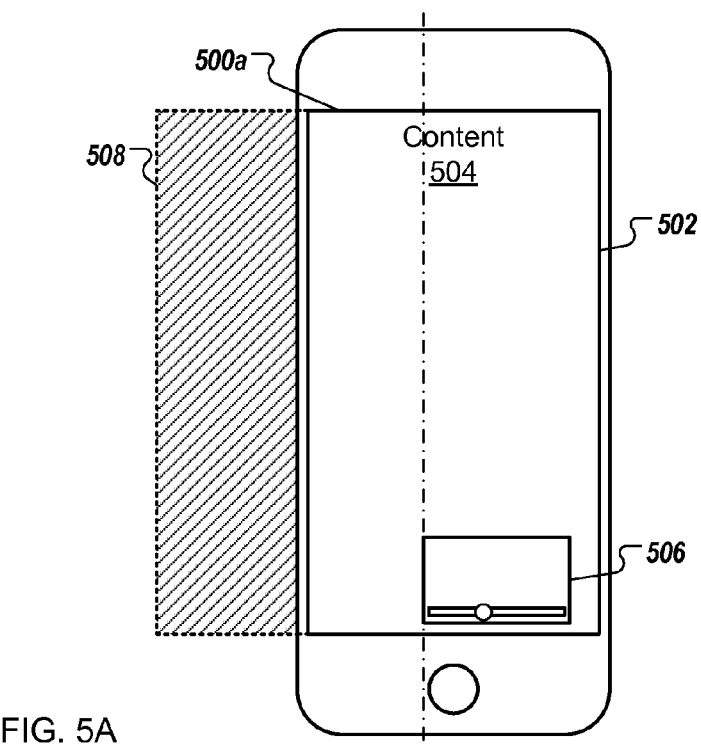
FIG. 5A illustrates an example GUI that includes a dynamic media player, in accordance with another embodiment.
Figure 5B:
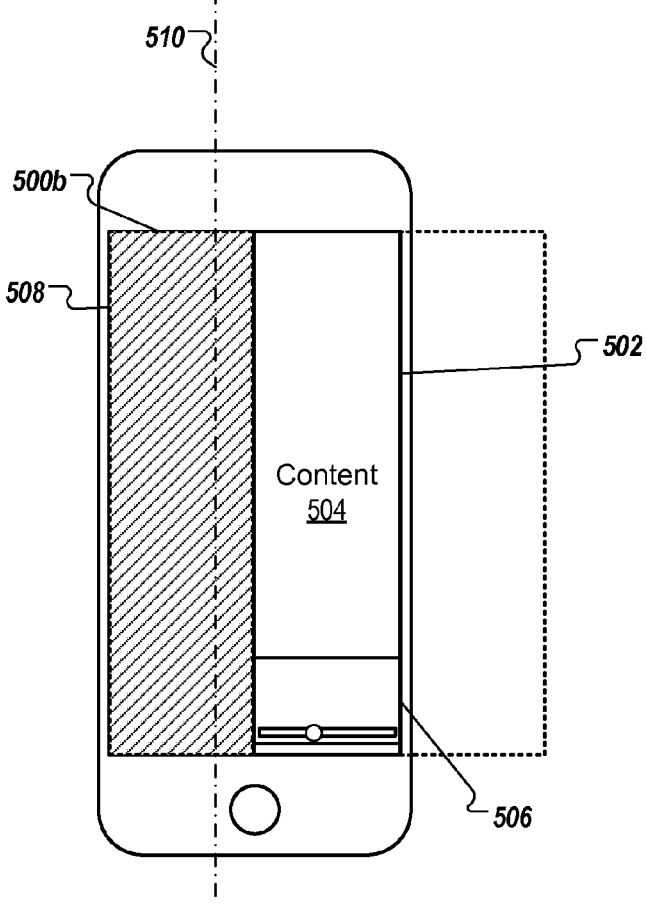
FIG. 5B illustrates an example GUI that includes an alternate view of a dynamic media player, in accordance with another embodiment.

FIGS. 5A-B illustrate example GUIs 500 that demonstrate the dynamic nature of the dynamic media player in accordance with aspects of the present disclosure. The example GUIs include a menu 508 (e.g., a guide tray), a browse area 502 and a dynamic media player 506. The menu 508 and the browse area 502 can be presented as if they were one continuous surface. In FIG. 5A, the menu 508 is not viewable by the user in the GUI 500a. For reference purposes, the left side of the dynamic media player 506 is coincident with an invisible reference line 510. A user, for example, can use a gesture to move the browse area 502 to the right, which exposes the menu 508, as illustrated in FIG. 5B. When the menu 508 is moved onto the viewing area of the GUI 500b, the position of the dynamic media player 506 can dynamically change such that it does not overlap the menu 508. In FIG. 5B, the position of the dynamic media player 506 is further to the right when the menu 508 is visible as compared to the position of the dynamic media player 506 in GUI 500a.

The menu 508 and browse area 502 may work together as a single, continuous surface. Swiping to the right moves the browse area 502 off the screen to the right, while the menu 508 moves in from the left. The menu 508 and browse area 502 do not overlap each other, but form a single surface which slide together as a unit. The dynamic media player 506 can slide over the top of the display area of the screen independent of the menu 508 and browse area 502.

Figure 6:
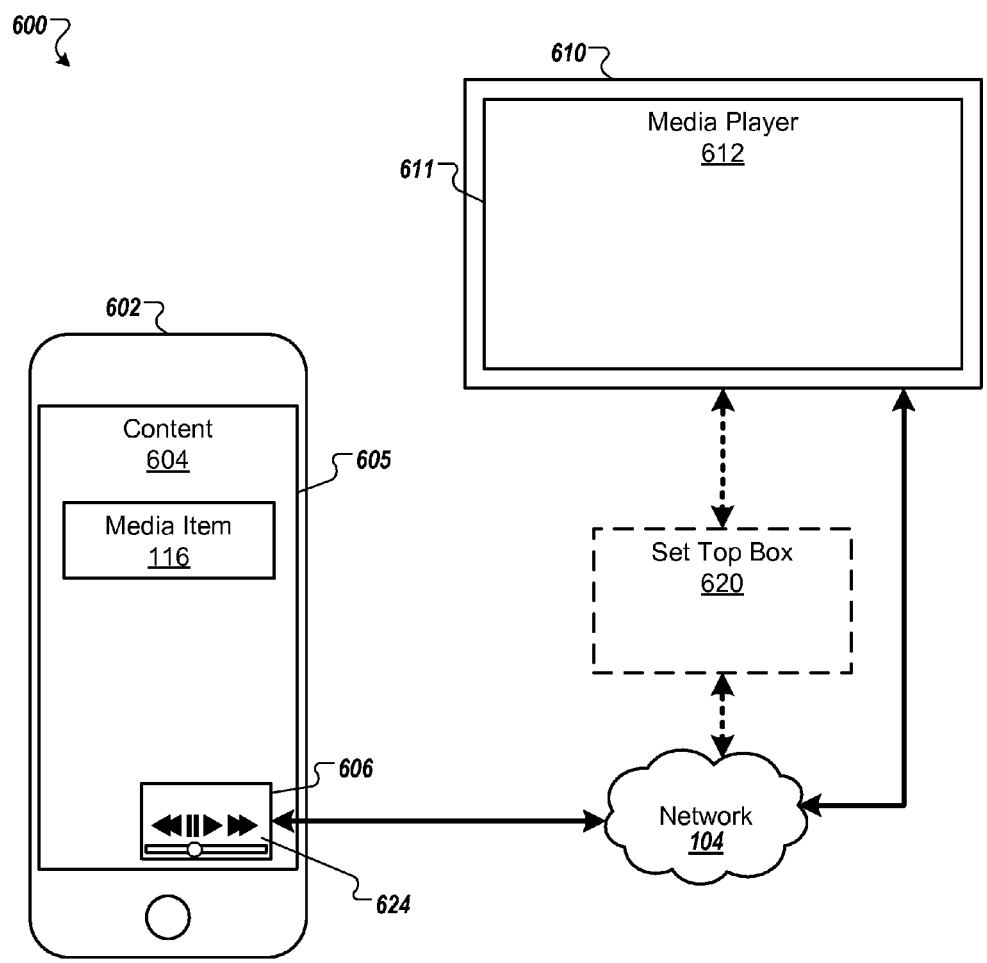
FIG. 6 illustrates an example system that includes a first user device with a first UI to cause a media item to play in a media player in a second UI on a first or second user device, in accordance with some embodiments.

FIG. 6 illustrates an example system 600 that includes a first user device 602 with a first UI 605 to cause a media item 116 to play in a media player 612 in a second UI 611 on a first or second user device, in accordance with some embodiments. The first device 602 may be a client device 102, as described in conjunction with FIG. 1. The second device 610 may be a different client device 118, as described in conjunction with FIG. 1. In some embodiments, the first UI 605 and the second UI 611 are both presented on the first device 602. In other embodiments, the first UI 605 is presented on the first device 602 and the second UI 611 is presented on the second device 610. The first device 602 and the second device 610 may be in communication via a network 104, as described in conjunction with FIG. 1.

The first device 602 may include a display to present a UI 605 that includes content 604, as described herein. The content 604 may be any content (e.g., search results, social media, webpage) that includes or identifies at least one media item 116. The first device 602 may also present a mini player 606 in a first portion of the UI 605 and the content 604 in a second portion of the UI 605. The mini player 606 can be an interface tool that receives requests from a user, via the UI 605, that pertain to playback of the media item 116 in the second UI 611. For example, a user may provide input via the mini player 606 to play a media item 116 in the second UI. In a specific example, the user may drag and drop a media item 116 to the mini player 606. Upon receiving the dropped media item 116, the mini player 606 may cause the media item 116 to be played in the second UI 611.

A user of the first device 602 may provide a media request to play the media item 116 in the second device 610. For example, first device 602 may receive the media request from the user in the form of a gesture. The user may touch an area of the display of the first device 602 that corresponds to the media item 116 and, while keeping in contact with the display, the user may drag the media item 116 or its identifier (e.g., link) to the mini player 606, similar to what is described in conjunction with FIG. 3. The mini player 606 is associated with the media player 612 and can cause media items to play, stop, pause, fast forward, rewind, etc. in the media player 612 in the second UI 611.

Upon receiving the media request to play the media item 116, the first device 602 may cause a media player in the second UI 611 to play the media item 116. In some embodiments, the first device 602 requests the media item 116 from a content platform (not shown), such as the content sharing platform 106 of FIG. 1. The content platform may determine whether the second device 610 is authorized to play the media item 116. If the second device 610 is authorized (e.g., based on a user account on the content platform), the content platform may provide the media item 116 to the second device 610. In some implementations, the content platform sends (e.g., streams) the media item 116 directly to the second device 610. In some implementations, the content platform sends the media item 116 to the first device 602 and the first device 602 then sends (e.g., streams) the media item 116 to the second device 610. In one example, the first device 602 may be a mobile device (e.g., a smart phone or a tablet) of a user, and the second device 610 may be a television of the user. Alternatively, the first device 602 may be a mobile device of a user, and the second device 610 may be a laptop computer of the user. Yet alternatively, the first device 602 may be a user device (e.g., a mobile device, a laptop, etc.) of a first user, and the second device 610 may be a user device (e.g., a mobile device, a laptop, a television, a smart TV, etc.) of a second user.

In further implementations, the system 600 includes a set top box 620 that is coupled to the second device (e.g., a television) 610, such as via a cable or the network 104, and the set top box 620 receives the media item 116 from the first device 602 or the content platform, and sends the media item 116 to the media player 612. In some embodiments, the set top box 620 performs one or more encode or decode operations on the media item 116 before sending to the media player 612.

While the media player 612 is presenting the media item 116 to a user, the first device 602 may receive an activity request (such as via the first UI 605) from the user to perform an activity that is independent of the viewing of the media item 116. The first device 602 may present content 604 associated with the requested activity in the first UI 605 while the media player 612 in the second UI 611 provides playback of the media item 116. The first device 602 may also present, in the mini player 606, a representation (e.g., thumbnail, title) of the media item 116 being played in the media player 612. Such a representation may be displayed only if the playback of a respective media item was requested on the first device 602. Once the playback of the media item ends, the first device 602 is notified and the representation of the media item is no longer displayed in the mini player 606. Alternatively, a presentation of any media item played by the media player 612 is displayed in the mini player 606, including media items requested for playback on the second device 610. In some implementations, the mini player 606 maintains a list of media items played by the media player 612 that can be viewable by the user. The user can then use this list to create a playlist of media items, or such a playlist can be automatically created.

The first device 602 may also present one or more transport controls 624 for controlling playback of the media item 116 in the media player 612. The transport controls may also include a scrubber for changing the playback position of the media item 116. The transport control 624 may receive a request pertaining to playback of the media item in the media player 612 (e.g., to rewind, stop, pause, play and fast forward). In some embodiments, the first device 602 receives a selection of the transport control (e.g., play control) and, in response to the received user selection, the first device 602 instructs a content platform (not shown) to stream the media item for playback in the media player 612, as described herein.

FIGS. 7-10 are flow diagrams illustrating methods for performing various operations, in accordance with some embodiments of the present disclosure, including providing a dynamic resizable media item player. The methods may be performed by processing logic that comprises hardware (e.g., circuitry, dedicated logic, programmable logic, microcode, etc.), software (e.g., instructions run on a processor to perform hardware simulation), or a combination thereof. Processing logic can control or interact with one or more devices, applications or user interfaces, or a combination thereof, to perform operations described herein. When presenting, receiving or requesting information from a user, processing logic can cause the one or more devices, applications or user interfaces to present information to the user and to receive information from the user.

For simplicity of explanation, the methods of FIGS. 7-10 are depicted and described as a series of operations. However, acts in accordance with this disclosure can occur in various orders and/or concurrently and with other operations not presented and described herein. Further, not all illustrated operations may be required to implement the methods in accordance with the disclosed subject matter. In addition, those skilled in the art will understand and appreciate that the methods could alternatively be represented as a series of interrelated states via a state diagram or events.

Figure 7:
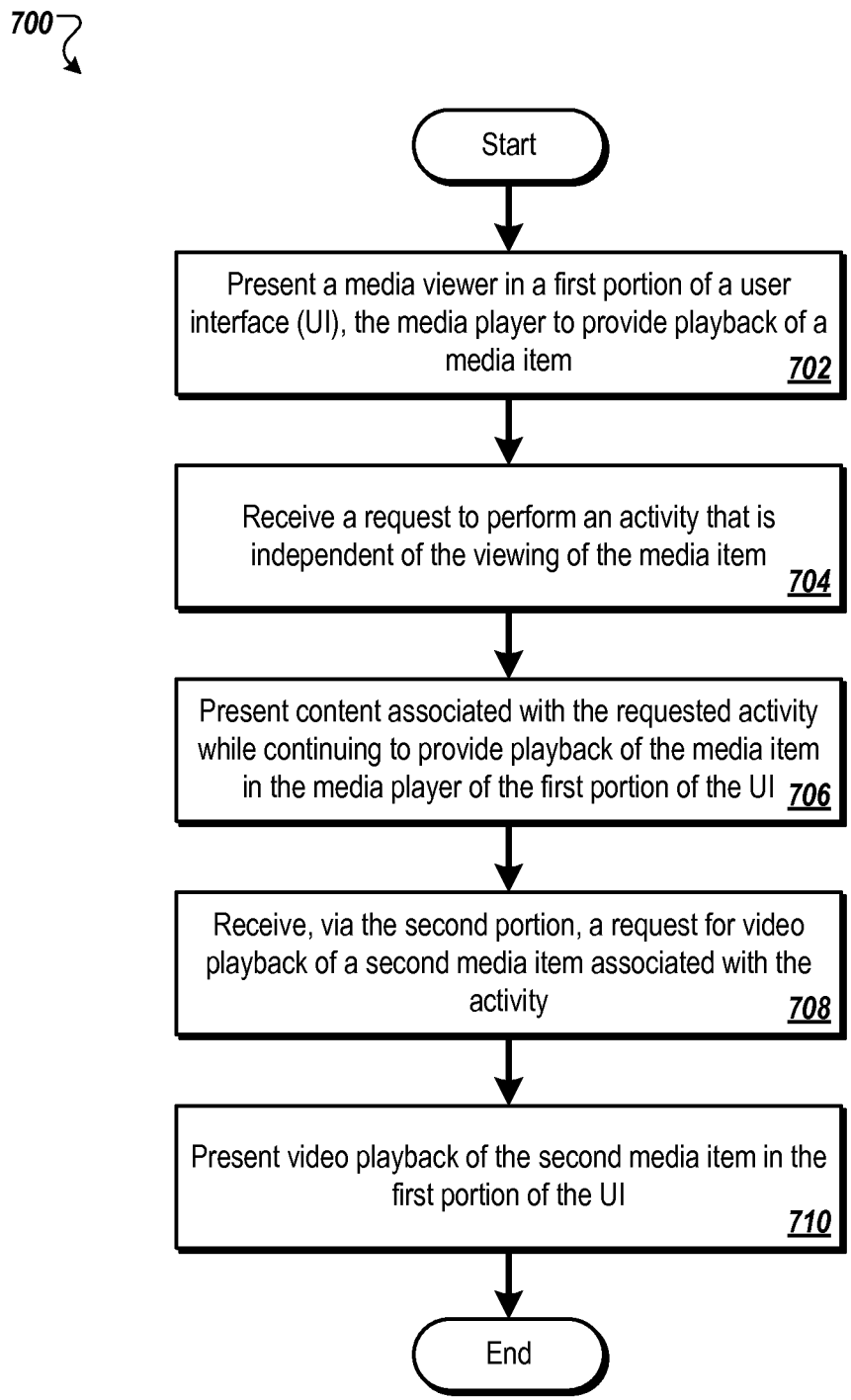
FIG. 7 is a flow diagram illustrating a method of providing a dynamic resizable media item player, in accordance with some embodiments.

FIG. 7 is a flow diagram illustrating a method 700 of providing a dynamic resizable media item player, in accordance with some embodiments of the present disclosure. In one implementation, method 700 may be performed by a GUI generator 108, as illustrated in FIG. 1.

Referring to FIG. 7, the method 700 begins at block 702 where processing logic presents a media player in a first portion of a user interface (UI) of a content sharing platform on a mobile device, the media player to provide playback of a media item.

At block 704, the processing logic receives, via a second portion of the UI, a user request to perform an activity that is independent of the viewing of the media item. The processing logic may present the media player as part of an application and the activity is associated with the application. The activity may be a search for a second media item, and wherein the content is provided by a search engine platform. In some implementations, the activity comprises an interaction with an electronic advertisement.

At block 706, the processing logic presents content associated with the requested activity while continuing to provide playback of the media item in the media player of the first portion of the UI. In some implementations, the activity is social networking, and the content presented in the second portion is provided by a social network application.

At block 708, the processing logic receives, via the second portion, a request for video playback of a second media item associated with the activity. For example, a user may discovery a video of interest and may request to watch the video. At block 710, the processing logic presents video playback of the second media item in the first portion of the UI.

Figure 8:
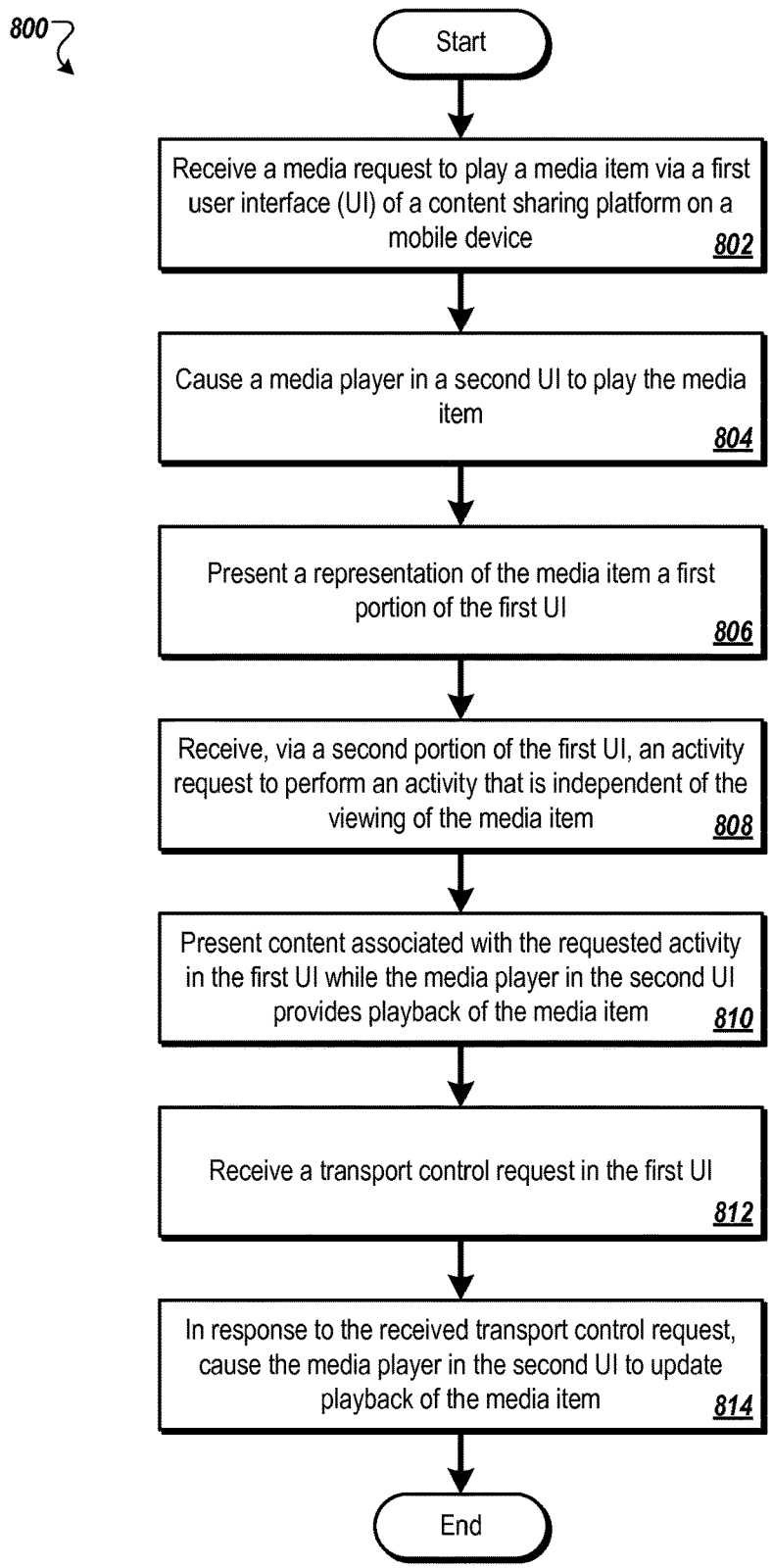
FIG. 8 is a flow diagram illustrating a method of providing a media item player in a first UI to control media item playback in a second UI, in accordance embodiments.

FIG. 8 is a flow diagram illustrating a method 800 of providing a media item player in a first UI to control media item playback in a second UI, in accordance with some embodiments of the present disclosure. In one implementation, method 800 may be performed by a GUI generator 108, as illustrated in FIG. 1.

Referring to FIG. 8, the method 800 begins at block 802 where processing logic receives a media request to play a media item via a first user interface (UI) on a mobile device.

At block 804, the processing logic causes a media player in a second UI to play the media item. In some implementations, the processing logic may also present a transport control to receive a request pertaining to playback of the media item in the media player. The transport control may include at least one of: play, fast-forward, rewind, stop, or pause. In some implementations, the first UI is presented on a first client device and the second UI is presented on a second client device.

At block 806, the processing logic presents a representation of the media item in a first portion of the first UI, where the first portion is associated with the second UI (e.g., by managing media items played in the second UI). In some implementations, the representation of the media item is a thumbnail, a title, an image, etc. of a media item, At block 808, the processing logic receives, via a second portion of the first UI, an activity request to perform an activity that is independent of the viewing of the media item. In some implementations, the activity is messaging, and the content includes a plurality of messages from at least two different users of a message service. In other implementations, the activity may be any of web browsing, web searching, gaming, social networking, etc.

At block 810, the processing logic presents content associated with the requested activity in the first UI while the media player in the second UI provides playback of the media item.

At block 812, the processing logic receives a selection of the transport control pertaining to a different media item. At block 814, the processing logic instructs a content platform to stream the different media item for playback in the media player in response to the received user selection.

Figure 9:
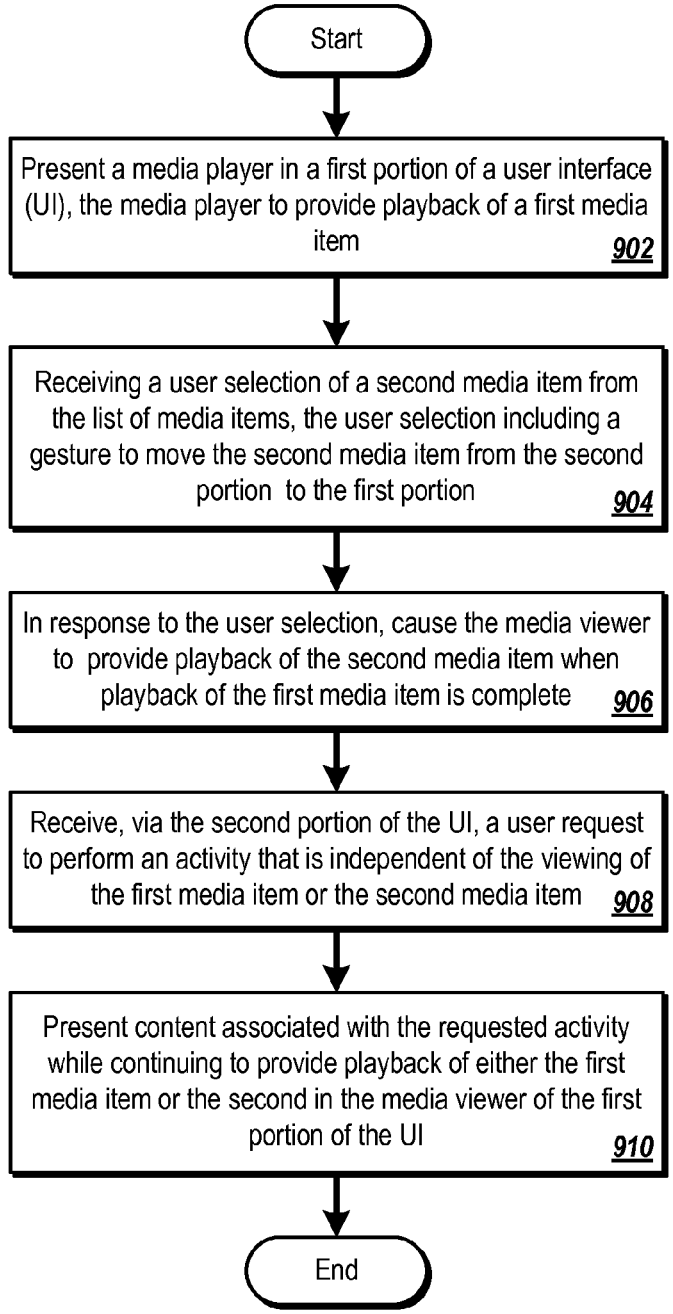
FIG. 9 is a flow diagram illustrating a method of providing a dynamic resizable media item player, in accordance with some embodiments.

FIG. 9 is a flow diagram illustrating a method 900 of providing a dynamic resizable media item player, in accordance with some embodiments of the present disclosure. In one implementation, method 900 may be performed by a GUI generator 108, as illustrated in FIG. 1.

Referring to FIG. 9, the method 900 begins at block 902 where processing logic presents a media player in a first portion of a user interface (UI) of a content sharing platform on a mobile device. The media player may provide playback of a first media item.

At block 904, the processing logic receives a user selection of a second media item via a second portion of the UI. The user selection may include a gesture to move the second media item from the second portion of the UI to the first portion of the UI. The user selection may be received while the media player in the first portion of the UI is playing the first media item. In some implementations, responsive to the user selection, the second media item is added to a playlist. The second media item may be added to the playlist automatically (without any user request to do so).

At block 906, the processing logic causes the media player to automatically provide playback of the second media item when playback of the first media item is complete. In some implementations, causing the media player to provide playback of the second media item includes presenting, in the first portion of the UI, a transport control for the media player to advance to a next media item in the playlist when receiving a selection of the transport control, and in response to the selected transport control, causing the media player to provide playback of the second media item. In some implementations, the playlist includes at least two different types of media items. For example, the playlist may include a video and an audio track. In some embodiments, responsive to the user selection, the processing logic adds the second media item to a playlist.

At block 908, the processing logic receives, via the second portion of the UI, a user request to perform an activity that is independent of the viewing of the first media item or the second media item, as described herein.

At block 910, the processing logic presents content associated with the requested activity while continuing to provide playback of either the first media item or the second media item in the media player of the first portion of the UI.

Figure 10:
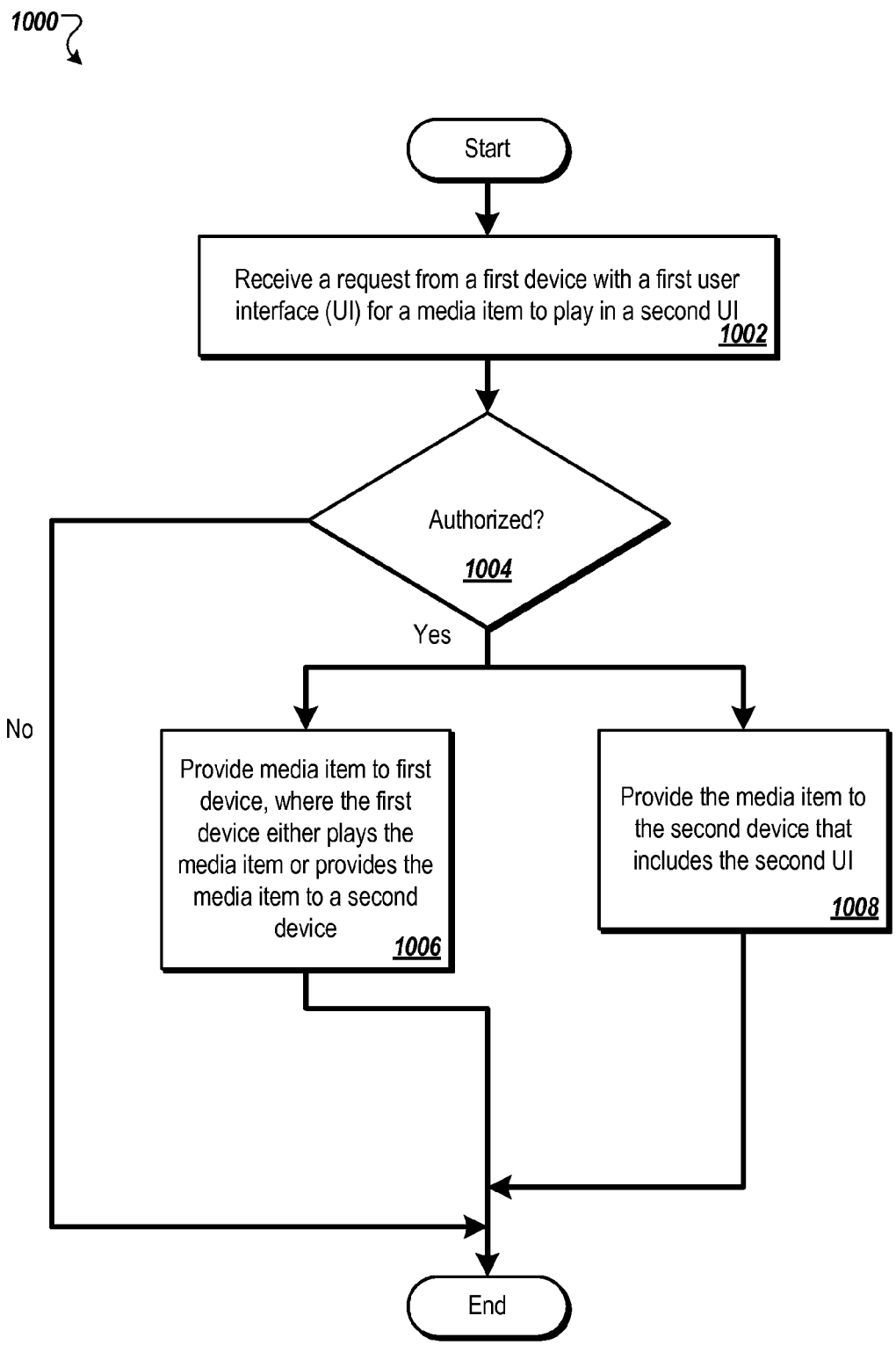
FIG. 10 is a flow diagram illustrating a method for receiving a request for a media item via a first UI and providing the requested media item for playback in a second UI, in accordance with some embodiments.

FIG. 10 is a flow diagram illustrating a method 1000 for receiving a request for a media item via a first UI and providing the requested media item for playback in a second UI, in accordance with some embodiments. In one implementation, method 1000 may be performed by a content sharing platform 106, as illustrated in FIG. 1.

Referring to FIG. 10, the method 1000 begins at block 1002 where processing logic receives a request from a first device with a first user interface (UI) for a media item to play in a second UI. The first UI may be presented on a first device and the second UI may be presented either on the first device or on a second device. In some implementations, the request from the first device includes both the request for the media item and an identifier of the second UI. When the second UI is associated with a second device, the identifier of the second UI may include characteristics of the second device, such as a MAC address, IP address, a unique identifier assigned by a content hosting platform, etc.

At block 1004, the processing logic may perform a check as to whether the second UI is authorized to play the media item. In embodiments, the processing logic may use the identifier of the second UI to perform the check. The processing logic may query a database that includes a record of identifiers of authorized UIs and/or devices. When the processing logic locates the identifier from among the record of identifiers of authorized UIs and/or devices, the processing logic can proceed to block 1006 or 1008.

In some embodiments, the first device and the second UI/device are associated with a user account. When the processing logic receives the request from the first device to play the media item on the second device, the processing logic can check for devices that have been associated with the user account. When both the first device and the second device are associated with the account, the processing logic can proceed to block 1008.

In some embodiments where the request does not include an identifier of the second UI or a second device, the processing logic can check a user account for authorized devices. Upon identifying an authorized device that includes the second UI, the processing logic may proceed to block 1008. For example, a user may associate a mobile device and a television with a user account. When the processing logic receives a request from the mobile device to play a media item, the processing logic can identify the television as being an authorized device and then proceed to block 1008.

In some embodiments, the first device is associated with a first user and the second device is associated with a second user. Upon receiving a request from the first user device to play the media item on the second user device, the processing logic may check whether the second user has authorized media items from the first user. For example, the second user may have previously provided input to always receive and allow media items from the first user. Alternatively, the processing logic can provide a prompt to the second user to confirm whether the second user would like to receive the media item. For example, when the first user requests to provide the media item to the second user, a GUI dialog box may appear on the second device that asks the second user if they would like to receive the media item. When the second user provides affirmative input (e.g., yes, accept), the processing logic may proceed to block 1008.

In some implementations, the processing logic may request user credentials from a requesting user before performing the authorization check. Upon receiving valid access credentials, the processing logic may proceed with the authorization check at block 1004.

At block 1006, the processing logic provides the media item to the first device. The processing logic can provide the media item directly, or the processing logic may provide instructions to a media server to provide the media item to the first device. When the first device includes the second UI, the first device may play the media item in the second UI. When a second device presents the second UI, the first device may provide (e.g., stream) the media item to the second device for playback in a media player in the second UI.

At block 1008, the processing logic can provide the media item directly to a second device when the second UI is associated with the second device.

Although implementations of the disclosure are discussed in terms of content sharing platforms and media consumption view the content sharing platform, implementations may also be generally applied to any type of social network providing connections between users. Implementations of the disclosure are not limited to content sharing platforms that provide channel subscriptions to users.

In situations in which the systems discussed here collect personal information about users, or may make use of personal information, the users may be provided with an opportunity to control whether the content sharing platform collects user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by the content sharing platform.

Figure 11:
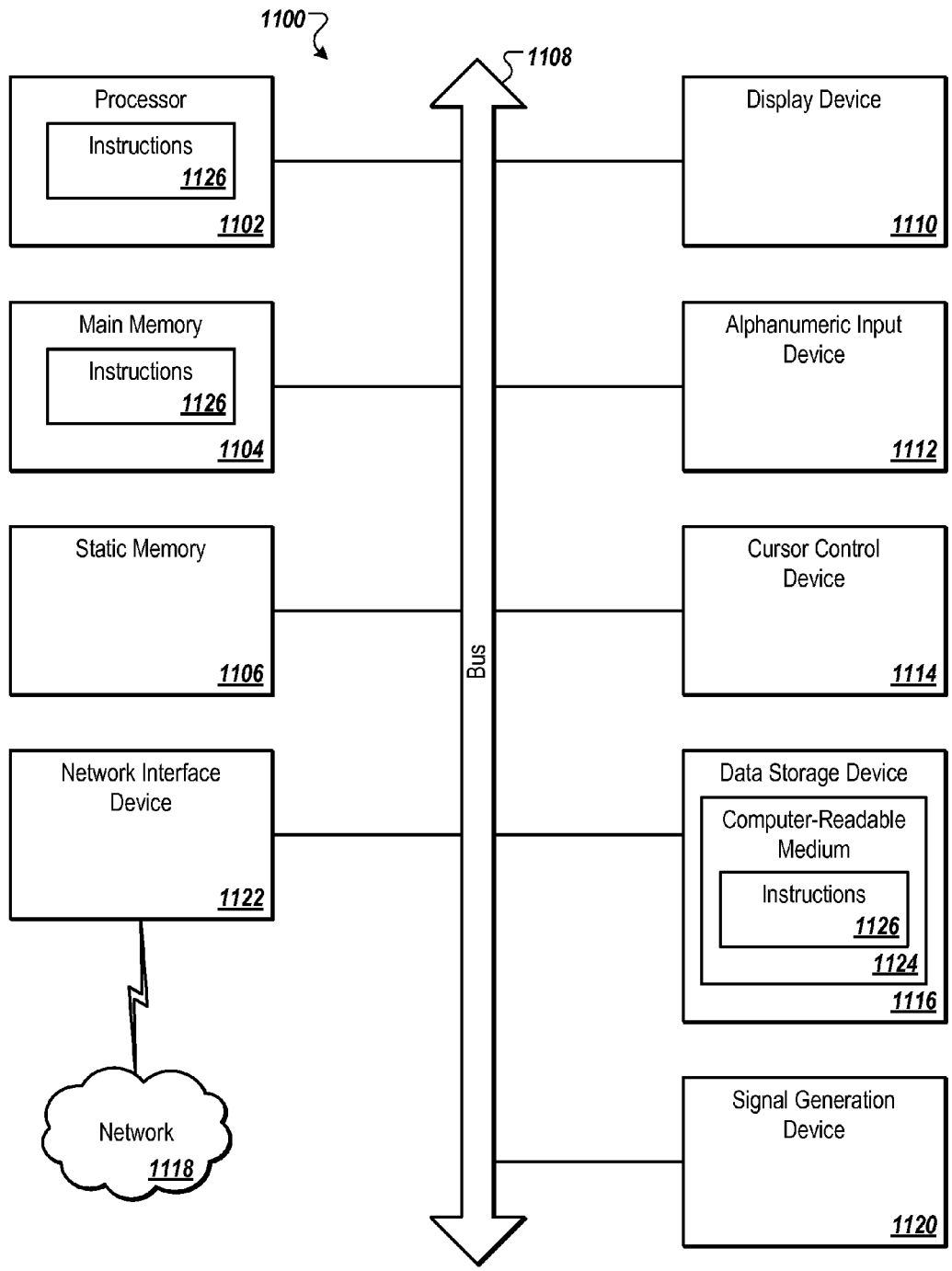
FIG. 11 illustrates block diagram of an example computing device that may perform one or more of the operations described herein.

FIG. 11 is a schematic diagram that shows an example of a machine in the form of a computer system 1100. The computer system 1100 executes one or more sets of instructions 1126 that cause the machine to perform any one or more of the methodologies discussed herein. The machine may operate in the capacity of a server or a client machine in client-server network environment, or as a peer machine in a peer-to-peer (or distributed) network environment. The machine may be a personal computer (PC), a tablet PC, a set-top box (STB), a personal digital assistant (PDA), a mobile telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute the sets of instructions 1126 to perform any one or more of the methodologies discussed herein.

The computer system 1100 includes a processor 1102, a main memory 1104 (e.g., read-only memory (ROM), flash memory, dynamic random access memory (DRAM) such as synchronous DRAM (SDRAM) or Rambus DRAM (RDRAM), etc.), a static memory 1106 (e.g., flash memory, static random access memory (SRAM), etc.), and a data storage device 1116, which communicate with each other via a bus 1108.

The processor 1102 represents one or more general-purpose processing devices such as a microprocessor, central processing unit, or the like. More particularly, the processor 1102 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 1102 may also be one or more special-purpose processing devices such as an application specific integrated circuit (ASIC), a field programmable gate array (FPGA), a digital signal processor (DSP), network processor, or the like. The processor 1102 is configured to execute instructions of the dynamic media player for performing the operations and steps discussed herein.

The computer system 1100 may further include a network interface device 1122 that provides communication with other machines over a network 1118, such as a local area network (LAN), an intranet, an extranet, or the Internet. The computer system 1100 also may include a display device 1110 (e.g., a liquid crystal display (LCD) or a cathode ray tube (CRT)), an alphanumeric input device 1112 (e.g., a keyboard), a cursor control device 1114 (e.g., a mouse), and a signal generation device 1120 (e.g., a speaker).

The data storage device 1116 may include a computer-readable storage medium 1124 on which is stored the sets of instructions 1126 of the dynamic media player embodying any one or more of the methodologies or functions described herein. The sets of instructions 1126 of the dynamic media player may also reside, completely or at least partially, within the main memory 1104 and/or within the processor 1102 during execution thereof by the computer system 1100, the main memory 1104 and the processor 1102 also constituting computer-readable storage media. The sets of instructions 1126 may further be transmitted or received over the network 1118 via the network interface device 1122.

While the example of the computer-readable storage medium 1124 is shown as a single medium, the term "computer-readable storage medium" can include a single medium or multiple media (e.g., a centralized or distributed database, and/or associated caches and servers) that store the sets of instructions 1126. The term "computer-readable storage medium" can include any medium that is capable of storing, encoding or carrying a set of instructions for execution by the machine and that cause the machine to perform any one or more of the methodologies of the present disclosure. The term "computer-readable storage medium" can include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

The components and other features described herein can be implemented as discrete hardware components or integrated in the functionality of hardware components such as ASICs, FPGAs, DSPs or similar devices. In addition, these components can be implemented as firmware or functional circuitry within hardware devices. Further, these components can be implemented in any combination of hardware devices and software components.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "capturing", "performing", "causing", "encoding", "storing," "receiving," "assigning," "generating," "presenting," "transmitting," "obtaining," "displaying," "forming," or the like, may refer to the actions and processes of a machine, a computer system, or similar electronic computing device, that manipulates and transforms data represented as physical (e.g., electronic) quantities within the machine's registers and memories into other data similarly represented as physical quantities within the machine memories or registers or other such information storage, transmission or display devices.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form.

For simplicity of explanation, the methods have been depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture (e.g., a computer readable storage medium) to facilitate transporting and transferring such methods to computing devices. The term article of manufacture, as used herein, is intended to encompass a computer program accessible from any computer-readable device or storage media.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

Although the operations of the methods herein are shown and described in a particular order, the order of the operations of each method may be altered so that certain operations may be performed in an inverse order or so that certain operation may be performed, at least in part, concurrently with other operations. In another implementation, instructions or sub-operations of distinct operations may be in an intermittent and/or alternating manner.

Reference throughout this disclosure to "one implementation," or "an implementation" means that a particular feature, structure, or characteristic described in connection with the implementation or implementation is included in at least one implementation. Thus, the appearances of the phrase "in one implementation," or "in an implementation" in various places throughout this specification are not necessarily all referring to the same implementation. Furthermore, the particular features, structures, or characteristics may be combined in any suitable manner in one or more implementations.

Implementations also relate to an apparatus for performing the operations herein. This apparatus may be specially constructed for the required purposes or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory devices including universal serial bus (USB) storage devices (e.g., USB key devices) or any type of media suitable for storing electronic instructions, each of which may be coupled to a computing system bus.

The methods and systems described herein can be used in a wide variety of implementations, including as part of a mobile application ("app"), and can be part of photo or video-related software including a mobile operating system. Apps installed on the mobile device can access the systems and methods via one or more application programming interface (API).

The algorithms and displays presented herein are not inherently related to any particular computing system or other apparatus. Various general purpose systems may be used with programs in accordance with the teachings herein or it may prove convenient to construct more specialized apparatus to perform the required method steps. The required structure for a variety of these systems will be apparent from the description above. In addition, the present disclosure is not described with reference to any particular programming language. It will be appreciated that a variety of programming languages may be used to implement the teachings of the disclosure as described herein.

What is claimed is:

1. A method comprising:
presenting a media player in a first portion of a user interface (UI) on a mobile device, the media player to provide playback of a first media item;
relocating the media player to a second portion of the UI while continuing to provide playback of the first media item by the relocated media player, wherein the second portion is a predetermined portion of the UI;
receiving a user swipe gesture to move a second media item in a third portion of the UI into the relocated media player in the second portion of the UI, the user swipe gesture to move the second media item into the relocated media player causing the second media item to be added to a playlist that is not displayed in the UI;
upon receiving the user swipe gesture to move the second media item into the relocated media player in the second portion of the UI, causing the relocated media player to provide playback of the second media item from the playlist without displaying the playlist, wherein playback of the second media item is provided when playback of the first media item is complete;

receiving, via the third portion of the UI, a user request to perform an activity that is independent of the viewing of the first media item or the second media item; and presenting content associated with the requested activity while continuing to provide playback of either the first media item or the second media item in the relocated media player in the second portion of the UI.

2. The method of claim 1, wherein the first portion of the UI comprises a transport control to receive a user request to advance to a next media item in the playlist.

3. The method of claim 1, wherein the playlist comprises at least two different types of media items.

4. The method of claim 1, wherein the third portion of the UI comprises a plurality of search results including the second media item.

5. The method of claim 1, wherein the third portion of the UI comprises an activity feed including the second media item.

6. The method of claim 1, wherein the third portion of the UI comprises a media channel to which the user has subscribed, the media channel comprising the second media item.

7. An apparatus comprising:
a display device;
a memory communicably coupled to the display device; and
a processing device communicably coupled to the memory, the processing device to execute instructions to:
  present a media player in a first portion of a user interface (UI) on a mobile device, the media player to provide playback of a first media item;
  relocate the media player to a second portion of the UI while continuing to provide playback of the first media item by the relocated media player, wherein the second portion is a predetermined portion of the UI;
  receive a user swipe gesture to move a second media item in a third portion of the UI into the relocated media player in the second portion of the UI, the user swipe gesture to move the second media item into the relocated media player causing the second media item to be added to a playlist that is not displayed in the UI;
  upon receiving the user swipe gesture to move the second media item into the relocated media player, cause the relocated media player to provide playback of the second media item from the playlist without displaying the playlist, wherein playback of the second media item is provided when playback of the first media item is complete;
  receive, via the third portion of the UI, a user request to perform an activity that is independent of the viewing of the first media item or the second media item; and
  present content associated with the requested activity while continuing to provide playback of either the first media item or the second media item in the relocated media player in the second portion of the UI.

8. The apparatus of claim 7, wherein the first portion of the UI comprises a transport control to receive a user request to advance to a next media item in the playlist.

9. The apparatus of claim 7, wherein the third portion of the UI comprises a plurality of search results including the second media item.

10. The apparatus of claim 7, wherein the third portion of the UI comprises an activity feed including the second media item.

11. The apparatus of claim 7, wherein the third portion of the UI comprises a media channel to which the user has subscribed, the media channel comprising the second media item.

12. A non-transitory machine-readable storage medium storing instructions which, when executed, cause a processing device to perform operations comprising:
  presenting a media player in a first portion of a user interface (UI) on a mobile device, the media player to provide playback of a first media item;
  relocating the media player to a second portion of the UI while continuing to provide playback of the first media item by the relocated media player, wherein the second portion is a predetermined portion of the UI;
  receiving a user swipe gesture to move a second media item in a third portion of the UI into the relocated media player in the second portion of the UI, the user swipe gesture to move the second media item into the relocated media player causing the second media item to be added to a playlist that is not displayed in the UI;
  upon receiving the user swipe gesture to move the second media item into the relocated media player, causing the relocated media player to provide playback of the second media item from the playlist without displaying the playlist, wherein playback of the second media item is provided when playback of the first media item is complete;
  receiving, via the third portion of the UI, a user request to perform an activity that is independent of the viewing of the first media item or the second media item; and
  presenting content associated with the requested activity while continuing to provide playback of either the first media item or the second media item in the relocated media player in the second portion of the UI.

13. The non-transitory machine-readable storage medium of claim 12, wherein the first portion of the UI comprises a transport control to receive a user request to advance to a next media item in the playlist.

14. The non-transitory machine-readable storage medium of claim 12, wherein the playlist comprises at least two different types of media items.

15. The non-transitory machine-readable storage medium of claim 12, wherein the third portion of the UI comprises a plurality of search results including the second media item.

16. The non-transitory machine-readable storage medium of claim 12, wherein the third portion of the UI comprises an activity feed including the second media item.

17. The non-transitory machine-readable storage medium of claim 12, wherein the third portion of the UI comprises a media channel to which the user has subscribed, the media channel comprising the second media item.

* * * * *